Sept. 28, 1965           A. GASSER           3,208,654
METHOD AND DEVICES FOR OPERATING APPARATUS PASSED
THROUGH BY RECORD CARRYING FILMS
Filed Nov. 9, 1962           2 Sheets-Sheet 1
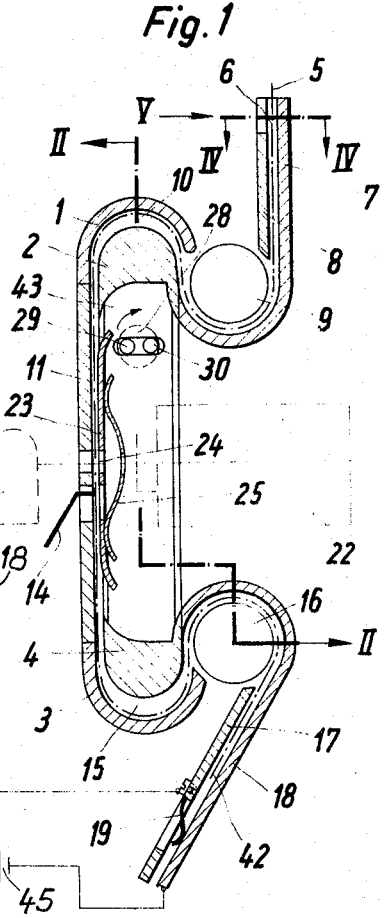
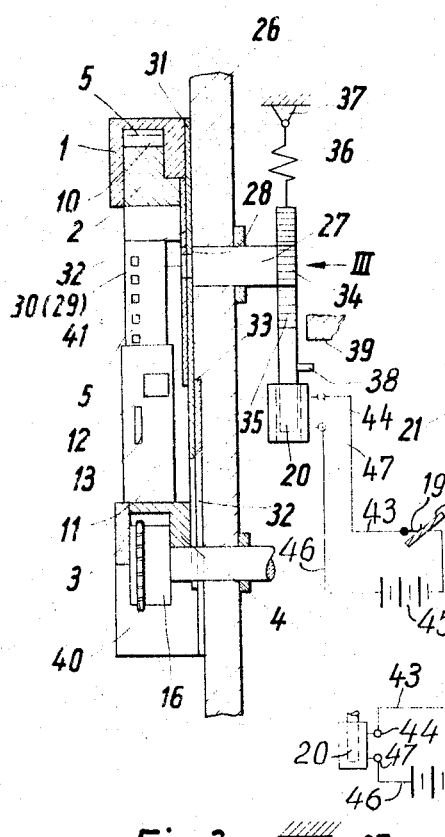
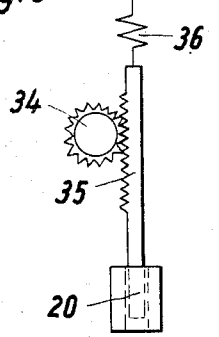
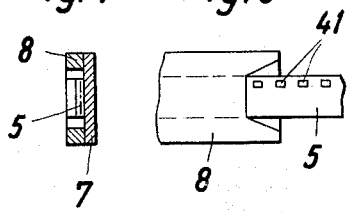
Inventor:
Adolf Gasser United States Patent Office 3,208,654
Patented Sept. 28, 1965

3,208,654
METHOD AND DEVICES FOR OPERATING APPARATUS PASSED THROUGH BY RECORD CARRYING FILMS
Adolf Gasser, Haus Maierhof 399,
Triesen, Liechtenstein
Filed Nov. 9, 1962, Ser. No. 236,574
Claims priority, application Austria, Nov. 18, 1961,
A 8,713/61
2 Claims. (Cl. 226—12)

The present invention relates to methods and devices for operating motion picture taking and reproducing equipment.

The invention is based on the recognition that a film carrying a sensitized layer is a good insulator and suitable for insulating otherwise closed electrical contacts if it is brought between these contacts and, if desired, left between them as long as is required for the control operations to be performed.

Based on this recognition, the method proposed according to the invention of operating motion picture taking and reproducing equipment is characterized in that the film is introduced between otherwise closed electrical contacts to open the same, whereas they are closed when the film has passed.

This method enables the automatic initiation or performance of a large number of operations which had previously to be initiated or performed by hand. The automatic action has the advantage that there cannot be an omission or incorrect manipulation so that the reliability of the equipment in operation is much improved compared to known, previous designs.

For instance, in motion picture taking eqiupment, the leading end of the film can be automatically connected, in dependence on an electric pulse generated by opening the contacts, to a storage spool, which serves for temporarily taking up the film during the exposure of a first film strip. This connection had previously to be effected by hand, which resulted in numerous errors, with the possible result that an inserted film was not exposed at all or was exposed twice, in case of an incorrect exchange of spools, so that scenes possibly occurring only once could not be recorded in a picture. By the automatic performance of the connection between the film and spool these disadvantages are reliably avoided.

In motion picture reproducing equipment, an electric pulse produced by opening the contacts may be used for automatically moving a film looper into its operative position. These loopers are known per se and serve to prevent detrimental effects of the discrepancies which are due to the fact that the film can be unwound from or wound up on the spools only at a uniform speed whereas an intermittent motion of the film from one frame to the next by means of the feed claws is required so as to move successive frames into registry with the picture gate of the reproducing equipment. Movable guide elements serve to form a film loop, which is required to take up these discrepancies. If the film to be reproduced is first threaded into the apparatus, these guide elements for the film must be relatively slightly spaced apart to position the film correctly relative to the apparatus. These elements are moved to their operative position only when the film has been passed through them and when the complete loop of film has been formed. In this operative position, they are somewhat more widely spaced apart because said discrepancies are larger during the operation of the apparatus at the usual reproducing speeds than during threading which is performed at a low speed of the film. For moving the guide elements into their operative position, the known apparatus have a special handle in a conspicuous color to ensure that it will be reliably operated. Nevertheless, such handles may be overlooked, particularly in the dark projection room, and considerable trouble may arise during the showing of the film. If the film looper is automatically moved to its operative position, the operation will no longer depend on the actuation of handles, which may be overlooked. This results again in a considerable increase in the reliability of the apparatus in operation.

The measures described hereinbefore are only examples. There are numerous other operations which can be automatically controlled if the film itself is the initiating control means or if the leading and trailing ends of the film are jointly used to determine certain intervals of time, for instance in the last-mentioned example of providing for the operative position of the film looper. There is no restriction, of course, to the use only of the leading and/or trailing end of the film for control purposes. It is also possible if different scenes have been taken on the film, to cut rectangular apertures into the film between these scenes, which apertures are arranged to permit of a closing of the contacts at said apertures when the film is moved past the contacts. This enables an automatic energization of the room lighting means between two successive performances of a film so that the operator is relieved of this work. In the case of sound motion pictures, sound tapes can be automatically started in this way, which sound tapes may furnish an explanation of the forthcoming film performance. The same aperture may be used in conjunction with a time limit relay for temporarily stopping the reproducing equipment so that said explanation is furnished first, then the reproducing equipment is automatically started at the end of the explanation. Musical performances can be started and terminated in the same way. Transverse apertures disposed at different points of the width of the film may be used to cause different contacts to open and close so that the different control pulses obtained may be used for the automatic operation of different apparatus. In this case, one of the contact pieces must constitute a sensing contact, of course, to ensure a reliable contact making operation.

Device for carrying out the method may be designed in various ways because the control operation to be performed will essentially determine this design.

When it is desired, in motion picture taking equipment to connect the film to the storage spool, such a device is preferably characterized in that contact pieces are disposed in the path of the film, at least one of which contact pieces is movable and under the influence of an energy storage means, which maintains it urged against the other contact piece, and that the contacts are included in a circuit which contains an electromagnet, the armature of which is operatively connected to a threading device so that the threading device will move into its operative position when the contacts are opened. This threading device has a so-called cover guide, which is urged by the completely formed film coil into an ineffective position, from which it must obviously be moved when the leading end of a new film is to be connected to the spool which serves for temporarily taking up the film during the exposure of the first component strip of the film. Because the entrance of the film between the contact pieces causes the opening of a previously closed circuit, the electromagnet will be deenergized. In order to cause nevertheless a movement of the cover guide to its effective position, the arrangement must be such that the cover guide is moved to its effective position by a spring, which has previously been rendered ineffective by the armature being attracted by the electromagnet, whereas the spring is released when the electromagnet is deenergized.

When the object is to move the film looper of motion picture reproducing equipment into its operative position, as has been mentioned hereinbefore, the device is suitably again characterized in that contact pieces are disposed in the path of the film, at least one of which contact pieces is movable and under the influence of an energy storage device which maintains it urged against the other contact piece, and in that the contact pieces are included in a circuit which includes an electromagnet, the armature of which is operatively connected to a mechanism for shifting the movable parts of the film looper. A particularly simple design of this device will be obtained if the shifting mechanism comprises a stub shaft, which is rotatable under the influence of the armature of the electromagnet and against the action of the spring, the free end face of which stub shaft has two shifting pins, which engage a slide plate each, said slide plates being arranged to be relatively displaceable in parallel planes and carrying guide elements for forming the film loops. Because these guide elements suitably contact or face both film faces, the guide elements which engage the film on the outside of the upper loop and on the inside of the lower loop must perform an upwardly directed movement to reach their operative position whereas the reverse applies to those guiding elements which engage the film on the inside of the upper loop and on the outside of the lower loop. Nevertheless, two slide plates are sufficient if one of the slide plates is offset by the thickness of the other slide plate and is provided with a slot through which the other slide plate extends.

The drawing shows by way of example a device according to the invention for the automatic control of the film looper which is dependent on the leading end of the film.

FIG. 1 is a vertical longitudinal sectional view showing the essential parts of the film looper.

FIG. 2 is a sectional view taken on line II—II of FIG. 1,

FIG. 3 is a top plan view taken in the direction of the arrow III in FIG. 2,

FIG. 2 is a sectional view taken on line IV—IV of FIG. 1 through the film guide passage.

FIG. 5 is a top plan view taken in the direction of arrow V in FIG. 1,

Figure 6:
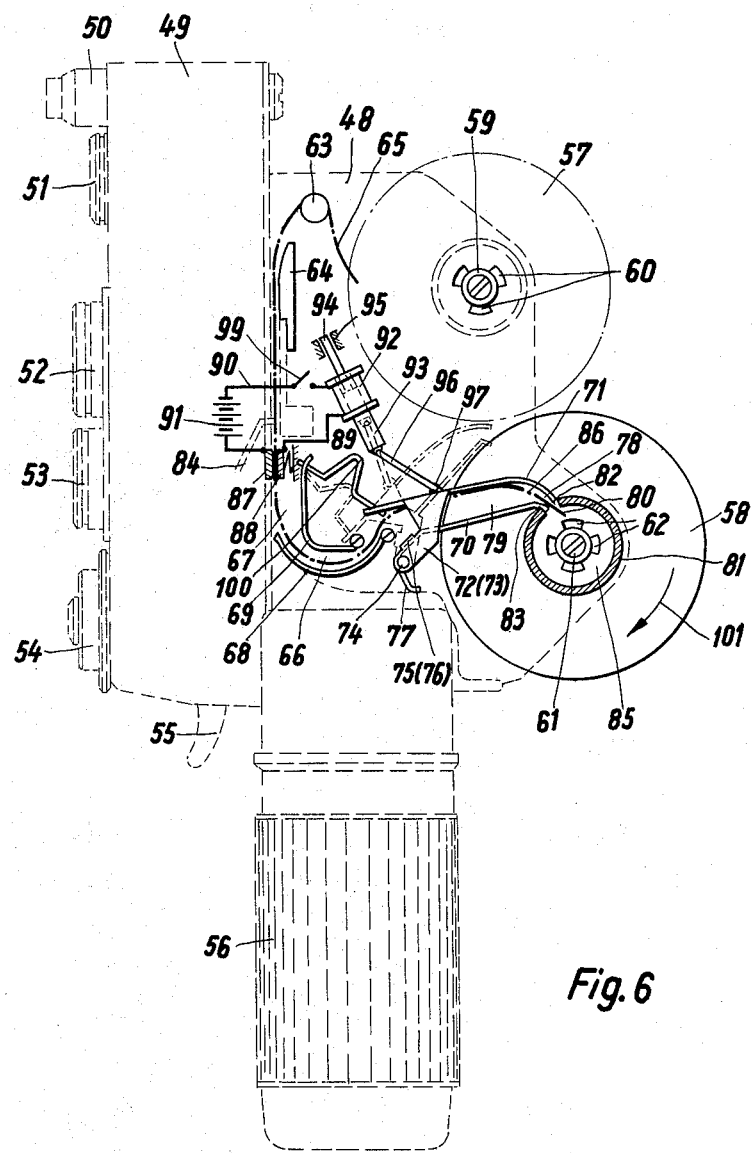

FIG. 6 is a top plan view showing a motion picture camera provided with means for automatically threading the film. The essential parts of this camera are shown in an exploded view. Those parts of the motion picture camera which are of minor importance are indicated in broken lines.

In all figures, 1 is a guide element engaging the outside of the upper film loop whereas 2 is the corresponding inner guide element for the upper film loop. The guide elements for the lower film loop are designated 3 and 4. The film 5 is shown with a dash and dot line. For threading the film, the guide passage 6 has guide rails 7 and 8 and a first feed roller 9. Parts 1 and 2 form a guide passage 10 for the upper film loop. The film 5 is then moved along a film guide 11, which is formed with a picture gate 12 and with another gate 13 for the for the film feed claw 14. The guide elements 3 and 4 form the guide passage 15, which is followed by a reversing roller 16 for the film. This is followed by guide rails 17 and 18 forming contact pieces. A contact spring 19 carried by the guide rail 17 is designed to engage the guide rail 18. The contact pieces 17, 19 on the one hand, and 18, on the other hand, are included in a circuit, not shown, which contains the electromagnet 20 shown in the drawing. In front of the picture gate 12, the light source 21 of the reproducing apparatus is shown, the lens of which is indicated at 22. A film pressure plate 23 formed with a picture gate 24 holds the film 5 in engagement with the film guide 11. The spring forces required for this purpose are provided by a leaf spring arrangement 25 disposed outside the beam of light.

FIG. 2 indicates that a vertical baseplate 26 of the apparatus serves for mounting the stub shaft 27, the free end face 28 of which carries two shifting pins 29, 30. The pin 29 engages an aperture in the slide plate 31, which carries the guide element 1. A second slide plate 32 is arranged parallel to the slide plate 31 and in direct contact with the same. The pin 30 is received by an aperture of the slide plate 32, which carries the movable guide element 2, the somewhat offset portion of which cooperates with the guide element 1 to define the film guide passage 10. The slide plate 32 has an offset portion 33 which extends at right angles to the plane of the plate. The horizontal surface of this offset portion is formed with a slot, through which the slide plate 31 extends, which is narrower than the slide plate 32 at least in that portion which extends through the slot. The slide plate 31 carries the inner guide element 4, which assists in forming the lower film loop, whereas the slide plate 32 carries the guide element 3 disposed on the outside. The stub shaft 27 forms a pinion 34, which is in mesh with the rack 35. The top end of the rack 35 is under the influence of the tension spring 36, which is suspended from the fixed point 37. The lower end of the rack 35 forms the armature or core of the above-mentioned electromagnet 20. The rack 35 carries also the nose 38, which is spaced a certain distance apart from a fixed stop 39 so that the lifting movement performed by the rack 35 under the influence of the tension spring 36 when the electromagnet 20 has been energized is limited in a certain position. FIGS. 1 and 2, considered jointly, indicate that the contact spring 19 is connected by the circuit part 43 to one terminal 44 of the electromagnet 20 whereas the guide rail 18 is connected by the battery 45 and the conductor 46 to the other terminal 47 of the electromagnet.

The mode of operation of the device is as follows:

FIGS. 1 to 3 of the drawing show the position obtained during the threading of the film so that parts 1 and 2, 3 and 4 have the smallest spacing. In this condition the film 5 is positively guided so that the teeth 40 of sprockets 9 and 16 enter the perforation 41 of the film 5 and the film is in such a position relative to the feed claws 14 that the latter can also enter the perforation 41 when they perform an entering movement toward the film and a subsequent downwardly directed feed movement. In this condition of the device the contact spring 19 of the guide rail 17 engages the guide rail 18. As a result, the electromagnet 20 is energized and by means of the toothed transmission 34, 35 and against the action of the tension spring 36 has moved the stub shaft 27 into a position in which the shifting pins 29, 30 are disposed one beside the other, as shown in FIG. 1, with their axes lying in a common horizontal plane.

This condition will be changed when the leading end 42 of the film lifts the contact tongue 19 from the guide rail 18. The previously closed circuit is thus opened to deenergize the electromagnet 20. The spring 36 can now pull the rack 35 upwardly so that the pinion 34 and the stub shaft 27 are rotated. By the rotation, the pin 29 is moved in the direction of arrow 43 so that the guide elements 1 and 4 are lifted by the slide plate 31 whereas the slide plate 32 with the guide elements 2 and 3 is lowered. As a result, the film passages 10 and 15 are increased to the size required during the operation of the reproducing apparatus so that the film loops have such a size that they can take up the discrepancies between the continuous feed movement of the film effected by the sprockets 9 and 16 and the intermittent feed movement of the film effected by the film feed claws 14.

FIG. 6 shows an illustrative embodiment of the invention in the form of a device for automatically threading the film into a take-up spool. Such a manually operable, also automatically acting device for threading the leading end of the film into the take-up spool is the subject matter of the U.S. Patent application (Ser. No. 167,319 filed January 19, 1962). In FIG. 6, 48 is the bearing plate of the camera body, the front part 49 of which is provided with the viewfinder 50, the cover plate 51 for the battery, not shown, of the photoelectrical diaphragm adjusting means, the lens 52, the light opening 53 for the diaphragm control means, the elements 54 for setting the picture frequency at the drive transmission, accommodated in the housing 49, for the rotation of the spools and for the operation of the film feed claws, also for stills, automatic shots or the like, as well as the starting and stopping handle (release) 55 for this transmission. The power source for the transmission is accommodated in the handle 56 and may consist of a mainspring drive, an electric battery and motor, or another power source for driving the transmission. The supply spool 57 has been introduced into the camera with the unexposed film. 58 is a take-up spool serving for temporarily taking up the exposed film. The supply spool 57 is fitted on the shaft 59, which carries leaf springs 60 for holding the fitted spool 57 in position. Similar parts 61, 62 are provided for the take-up spool 58. The drawing shows also the film guide 63, the film pressure plate 64 and the film 65 itself, which is indicated by a dash and dot line to distinguish it from the camera parts. It is apparent that after passing the film pressure plate 64 the film 65 can enter a passage 66, which is flared at 67 and defined by the guiding sheet metal elements 68, 69. The threading device is disposed behind the guiding sheet metal elements 68, 69. It comprises essentially a supporting guide 70 and a cover guide 71. The cover guide 71 is mounted by means of the side plates 72, 73 to be pivotally movable about the pin 74. The plates 72, 73 form stops 75, 76, which prevent the supporting guide 70 from approaching the cover guide 71 under the action of the spring 77 more closely than is shown in solid lines in FIG. 6 so that a passage slot 78 will always remain. The space 79 between the supporting guide 70 and the cover guide 71 opens into said slot 78 so that the threading of the leading end of the film 80 into a slot 82 formed in the hub 81 of the storing spool will be ensured even when the hub spool 81 and its slot 82 are in position of rest. This position of rest will be temporarily assumed because the supporting guide 70 is set at its front end with claws 83, which automatically snap into the slot 82 in the spool as soon as said slot 82 is in registry with the claws 83 during the rotation of the spool. This automatic engagement of the claws is caused by the action of spring 77, which tends to rotate the supporting and cover guides 70, 71 in the clockwise sense about the pivot 74. Because the feed claw 84 is already in operation, it continues to feed the film 65 so that the leading end 80 of the film is followed by further film portions 86. As a result, the leading end 80 of the film disposed in the space 85 confined by the hub 81 engages fixed parts disposed in said space, such as the shaft 61—or the leaf springs 62, or the hub 81 itself, and is thus stopped. This causes the film portion 86 to buckle and exert on the supporting guide 70 a force which produces a counterclockwise turning moment about the pivot 74 so that the parts 70, 71, 72, 73 rotatable about 74 are rotated in the same direction. As a result, the claws 83 of the supporting guide 70 are removed from the hub slot 82 and the known friction drive, not shown, causes the spool 58 to rotate again in the direction 101. The film 65 is then automatically wound on the hub 81 of the spool 58 after the film has been exposed.

A stirrup-shaped tilting spring 100 holds the supporting and cover guides 70, 71 in the two end positions indicated in the drawing. When the parts rotatable about 74 are in the position indicated with solid lines, this spring exerts on these parts a turning moment in the clockwise sense whereas the spring exerts a counterclockwise turning moment on these parts when they are in the position indicated with broken lines.

All this already known from said U.S. patent application (Ser. No. 167,319) and does not form part of the present invention.

According to the invention, the following features are provided.

The electrical contacts 87, 88 having well rounded inside faces are disposed in the path of film 65. The contact 88 is movable and under the action of a spring 89. The electrical contacts 87, 88 are included in a circuit comprising the battery 91 and electromagnet 92. The core 93 is guided in the electromagnet 92 and has a pin-shaped extension 94, which moves in the sleeve 95 so that the core 93 cannot be laterally displaced relative to the bore of the electromagnet 92. The core 93 is coupled by the link 96 to the supporting guide 70 at 97. The battery 91 may be that for controlling the diaphragm. In an electrically operated camera, the battery accommodated in the handle 56 may be tapped and used for feeding the circuit 90.

The device shown has the following mode of operation:

When the camera is started, the switch 99 included in the circuit 90 is closed. This switch may be arranged for automatic operation so as to become effective under the action of gravity to close the circuit 90 when the handle of the camera 56 is gripped whereas the gravity switch 99 is opened under the action of the camera when the same has been laid down. The switch 99 may be provided in the handle 56 so as to automatically close the circuit 90 when the handle 56 is gripped and to automatically open the circuit when the handle is released. Closing the circuit 90 results in the energization of the electromagnet 92. The armature 93 is pulled upwardly and by means of the lifted link 96 the cover guide 71 and the supporting guide 70 are moved into the position shown with broken lines so that both guides are outside of the spool flange 58. The spool 58 may now be fitted onto the shaft 61 without difficulty.

When the cover, not shown, has been closed and the release 55 is actuated to start the camera, the leading end 80 of the film will initially separate the contacts 87, 88 against the action of the spring 89 so as to open the circuit 90. The electromagnet 92 is de-energized and the forces of spring 77 can cause the cover guide 71 and the supporting guide 70 to be automatically pulled into position indicated with solid lines. The operation of the fed claw 84 causes the film to be threaded into the slot 82 of the hub of spool 58 as has been described hereinbefore. To render the weight of the core 93 ineffective, the pin 94 is provided with a throttled air or oil passage so that the spring 77 can move the parts 70, 71 only slowly into their effective position.

As son as the trailing end of the film wound up on the hub 81 of the spool 58 has passed the contacts 87, 88, these contacts will be closed. The circuit 90 is thus closed to energize the electromagnet 92. The core 93 is attracted and parts 71, 70 are pulled out of the range of the spool flanges 58. The spool fully wound with the film can readily be pulled from the shaft 61 and subjected to development.

The nature of the invention is such that it is not restricted to the embodiment shown but may be modified in many ways without departure from the essential spirit of the invention.

What is claimed is:

1. In a photographic apparatus, in combination, a pair of loop-forming means each having a pair of members spaced from each other and defining between themselves a curved film path; moving means operatively connected to said pair of loop-forming means for moving the latter between a threading position where said members of each loop-forming means are relatively close to each other and an operating position where said members of each loop-forming means are relatively distant from each other; operating means permanently tending to move said moving means and thereby said pair of loop-forming means from said threading into said operating position thereof; solenoid means operatively connected to said moving means for actuating the latter against the action of said operating means to place said pair of loop-forming means in said threading position when said solenoid means is energized; guide means located adjacent to one of said loop-forming means for receiving a film strip after it has moved through said pair of loop-forming means and for guiding the film strip along a given path, said guide means including a pair of wall portions spaced from each other and defining said path, and at least one of said wall portions being electrically conductive; a springy electrically conductive member carried by the other of said wall portions and engaging said one wall portion when there is no film between said wall portions, said one wall portion and said springy member forming a switch which is normally closed; and electrical circuit means operatively connected to said switch and to said solenoid means for maintaining the latter energized until a film strip moves between said springy member and said one wall portion, said film strip being made of an electrically non-conductive material so that until the leading end of the film strip reaches said springy member said solenoid means is energized to maintain said pair of loop-forming means in said threading position thereof while when the film moves between said springy member and said one wall portion the circuit of said solenoid means will be opened to de-energize said solenoid means and said pair of loop-forming means will automatically be moved into and held in said operating position thereof.

2. In a photographic apparatus, in combination, support means; means carried by said support means for mounting a take-up spool on the apparatus; threading means for automatically threading a film strip onto said take-up spool, said threading means being carried by said support means for movement between an operative position adjacent a hub of said spool and an inoperative position distant from said hub; operating means permanently tending to move said threading means from said inoperative into said operative position thereof; solenoid means operatively connected to said threading means for retracting said threading means against the action of said operating means from said operative to said inoperative position when said solenoid means is energized; guide means carried by said support means for guiding a film strip to said threading means, said guide means having a stationary electrically conductive wall portion and a movable electrically conductive wall portion which define between themselves part of the path along which said guide means guides a film strip; spring means urging said movable wall portion into engagement with said stationary wall portion, said wall portions respectively forming a pair of switch contacts; and an electrical circuit operatively connected to said switch contacts and said solenoid means for energizing the latter when said wall portions engage each other, so as to retract said threading means from said operative into said inoperative position thereof when said solenoid means is energized, while as long as an electrically non-conductive film strip is between said wall portions said solenoid means is unenergized and said threading means is moved by said operating means into and held in said operative position thereof so that said threading means is automatically maintained in its inoperative position before the leading end of a film strip reaches said wall portions and after the trailing end of said film strip moves beyond said wall portions, said threading means when in said inoperative position thereof being displaced beyond said take-up spool to facilitate exchanging of take-up spools.

References Cited by the Examiner

UNITED STATES PATENTS

| | | | |
|---|---|---|---|
| 1,468,754 | 9/23 | Smith | 271—57 |
| 2,051,787 | 8/36 | Foster | 242—55.11 |
| 2,203,655 | 6/40 | Lechleitner et al. | |
| 2,800,832 | 7/57 | Hintz. | |
| 2,811,353 | 10/57 | Alden | 271—57 |
| 2,891,736 | 6/59 | Blaes | 226—92 X |
| 3,040,945 | 2/62 | Lunzer | 226—91 |
| 3,063,610 | 11/62 | Briskin | 226—91 |
| 3,079,055 | 2/63 | Chevallaz | 226—91 |

M. HENSON WOOD, Jr., *Primary Examiner.*

ANDRES H. NIELSEN, SAMUEL F. COLEMAN, ROBERT B. REEVES, *Examiners.*